Dec. 2, 1958  G. E. BARNHART  2,862,354
ENGINE EXHAUST TREATING APPARATUS
Filed Sept. 20, 1954

George E. Barnhart
INVENTOR.

BY Donald L. Royer
AGENT

2,862,354
ENGINE EXHAUST TREATING APPARATUS

George E. Barnhart, Altadena, Calif.

Application September 20, 1954, Serial No. 457,163

1 Claim. (Cl. 60—30)

The present invention relates generally to an engine exhaust treating apparatus and relates more specifically to an apparatus for removing at least a major quantity of pollutants from engine exhaust products.

Due to particular temperature conditions and associated atmospheric phenomena, many thickly populated areas are plagued with the problem of increasing quantities of organic pollutants, noxious gases and fumes, smoke and the like, much of which is derived from the operation of internal combustion and other types of hydrocarbon fuel consuming machines. In one such area, it is estimated that approximately one-third of the pollutants contained in the atmosphere are derived from automobile exhausts. The balance of the pollutants in the atmosphere is created by various industrial activities, backyard private incinerators, and other related sources.

In industrial situations, it becomes relatively simple to eliminate the discharge of the major portion of pollutants into the atmosphere. However, in the case of privately owned automobiles, trucks, busses and the like, the number of such vehicles presents a considerable problem as to means by which the products of internal combustion may be eliminated from the atmosphere. Obviously, means must be provided to enable such elimination of pollutants through use of relatively inexpensive apparatus together with efficient operation and service means therefor. In any event, inasmuch as the atmospheric pollutants have been created by industrial activities and vehicular technological advances, it becomes necessary to cleanse the atmosphere of such pollutants in such a manner as to remove health hazards and the destructive effects upon plant life and corrosive effects upon metals, rubber, and the like, for the same reason that all civilized communities provide means for disposing of garbage, paper, scrap metal, and other forms of refuse.

In addition to the physical effects upon various articles including plant life and physical individual anatomical portions, it has been found that the presence of irritants and pollutants in the atmosphere tend psychologically to affect individuals subjected to such atmospheric material. In other words, at times when atmospheric pollutants are exceptionally heavy or when individuals are exposed to such pollutants over extending periods, considerable irritability, irrational actions, and confusion often are noted. Therefore, with this in mind, it becomes increasingly clear that provision must, by all means, be made for the elimination or substantial reduction of these atmospheric pollutants.

Prior attempts at solving the present problem have taken many forms. For example, various catalytic devices have been utilized, various filter arrangements have been tried, various chemical preparations have been utilized, air washing devices have been contemplated and other arrangements have been proposed, all of which have one or more disadvantages as to prohibit effective use thereof. For example, catalytic arrangements require the use of generally very large and bulky apparatus as to prohibit the transportation thereof in the average vehicle. Filter arrangements are susceptible to clogging and subsequently considerable back pressure effect on the engine, this also being true of chemically operated devices and air or gas washing arrangements. Additionally, prior arrangements have required frequent and elaborate service in order to maintain them in satisfactory operating conditions.

While the present invention will be directed primarily to a device including as a portion thereof a means for washing exhaust gas products admittedly, mere air washing or scrubbing arrangements have been utilized heretofore, however, the present invention contemplates the use and provision of mechanism enabling a washing action upon the engine exhaust gases in such a manner as to maintain continuous efficient operation, eliminate the heretofore obtained undesirable back pressure on the engine while still providing a non-clogging structure that is efficient in operation, relatively economical to manufacture, simple to service and maintain and conservative as to the utilization of a fluid air washing or scrubbing medium.

Accordingly, the present invention contemplates the utilization of an exhaust gas washing method coupled with a filter and, if necessary, a condenser arrangement which operate in cooperation one with the other to remove a major portion of pollutants from engine exhaust gases while still maintaining a relatively unrestricted flow of such gases from the engine thereby effecting an extremely low back pressure condition upon the engine.

It is accordingly the main object of the present invention to provide an engine exhaust gas treating apparatus that is devoid of the beforementioned unsatisfactory conditions in prior arrangements and is constructed and intended to operate in such a manner as to carry forth the beforementioned desirable characteristics.

It is another object of the present invention to provide an exhaust gas treating apparatus having an inherent operating characteristic enabling both the cleansing of exhaust gases and the silencing of exhaust sounds.

A further important object of the present invention is to provide an exhaust gas treating apparatus employing a fluid medium and wherein means are provided to cause vaporization of the medium as by heating or the like.

A still further important object of the present invention is to provide an exhaust gas treating apparatus having novel means for maintaining a low but constant operating back pressure upon exhaust gases emitting from an internal combustion engine regardless of various operating circumstances in the apparatus such as, for example, a changing level of a cleansing fluid.

Other and further important objects of the present invention will become apparent from the disclosures in the following detailed specification, appended claims and accompanying drawing, wherein:

Figure 1:
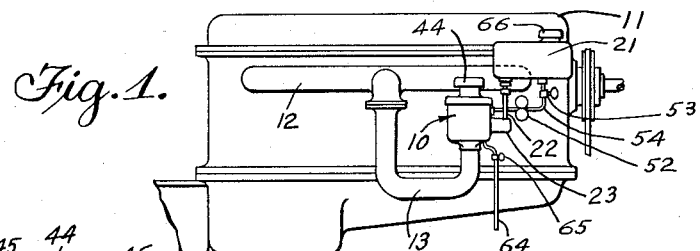
Fig. 1 is a side elevational view of an engine showing the exhaust gas treating apparatus position in conjunction therewith.

With reference to the drawings, wherein like characters indicate like parts, the engine exhaust gas treating apparatus of the present invention is shown as indicated generally at 10. As shown in Fig. 1, the device 10 is adapted for use with an engine 11 and may be positioned in conjunction with an exhaust gas manifold 12 in any desired position either adjacent the engine, as shown, or remotely located at some other portion of a vehicle in which the engine is disposed. Inasmuch as the device of the present invention removes a major quantity of dangerous carbon monoxide and other noxious products in the exhaust gases, it becomes feasible to mount the device at a position adjacent the engine 11, thus eliminating the necessity for extended exhaust pipe arrangements toward the rearward portion of the vehicle. Additionally, the device of the present invention has a secondary function of being able to muffle the exhaust sound of the engine thereby permitting the elimination of conventional mufflers and the like. While the device of the present invention is shown in Fig. 1 as being positioned adjacent the engine 11, it is to be understood that the device may be repositioned at any location relative to the engine without departing from the spirit and scope of the present invention.

As shown primarily in Figs. 1 and 2, the apparatus 10 may be mounted or permanently fixed in such a position so that the exhaust conduit 13 leading from the manifold 12 may extend to and into the device as will be hereinafter more fully described. As shown, the apparatus 10 includes a generally annular body member forming a container or housing 14. The lower portion of the housing 14 is formed conically downwardly as at 15 from sides of the housing with the central portion being provided with an outwardly extending cylindrical portion 15a that is adapted to surround an open end 16 of the exhaust pipe or conduit 13. A terminal end 17 of the conduit 13 is disposed in the interior lower area of the housing 14.

The lower portion of the housing 14 is adapted to contain a quantity of liquid indicated at 18 which may be, for the purpose of the present invention, a gas and solid absorber of any type such as, for example, water or the like. In this connection, it is to be understood that the present invention may employ a gaseous type absorber for eliminating noxious exhaust products within the meaning and scope of the claims herein and without departing from the spirit thereof. The level of the liquid as indicated at 20 is maintained slightly below the terminal end 17 of the exhaust conduit 13. The liquid 18 may be supplied to the housing 14 as from a suitable tank or container 21 which delivers the liquid through a conduit 22 and into a hollow extension 23 disposed outwardly from the housing 14. A valve member 24 which is carried by an arm 25 serves to control the flow of the liquid from the conduit 22 into the extension portion 23. The arm at 25 may be pivoted as at 26 and has a float member 27 carried by the end thereof opposite from the pivot 26. It may thus be seen that the construction is such as to enable maintenance of the level 20 of the liquid 18 at a predetermined height within the housing 14.

In order to insure deflection of the exhaust gases into the liquid 18 while still eliminating the possibility of back pressure upon the engine 11, an inverted cup-shaped deflector member 28 is positioned about the terminal end 17 of the conduit 13. The deflector member 28 is adapted to surround the terminal end 17 of the conduit 13 and to engage the surface 20 of the liquid 18 with an open lower end 30 of the deflector. The deflector 28 is maintained in its position contacting the surface 20 of the liquid 18 as by an annular float member 31 that is spaced outwardly from the deflector 28 and connected thereto as by a plurality of radially extending arms 32. The outer periphery of the float member 31 is adapted to be positioned closely adjacent to the inner surface of the wall of the container or housing 14 in order to maintain the deflector 28 in concentric relationship relative to the terminal end 17 of the conduit 13. It may thus be seen that the exhaust gases emitting from the conduit 13 will be deflected as by the arrows 33 and directed toward the surface of the liquid 18. The force of these gases will cause them to be driven downwardly into the liquid 18, thereby enabling washing and scrubbing thereof. In the event that the tank 21 may become low on liquid, the deflector 28 will seek the position shown by the dotted lines while the open end 30 thereof will still be maintained in contact with the surface 20 of the liquid 18 as by action of the annular float member 31.

In order to remove additional products of exhaust gases, a plurality of progressively finer screens are disposed above the deflector 28 and within the housing 14. The lowermost coarse screen 34 is maintained in position as by an annular bracket 35, screens 36 and 37 are maintained in spaced relationship as by annular spacers 38 and 40. As the exhaust gases leave the liquid 18, they will be conducted through the screens 34, 36 and 37 in their progress outwardly from the housing 14. The upper portion of the housing 14 may be closed as by a removable cap member 41 which threadably engages the housing 14 as at 42. An exhaust stack 43 is extended upwardly from the central portion of the cover member 41 and a guard or cover portion 44 may be disposed in spaced relationship as by struts 45 of the outer end of the exhaust stack 43. Thus, the exhaust products leaving the liquid 18 are permitted to move upwardly through the screens 34, 36 and 37 and outwardly to atmosphere through the exhaust stack 43.

Figure 2:
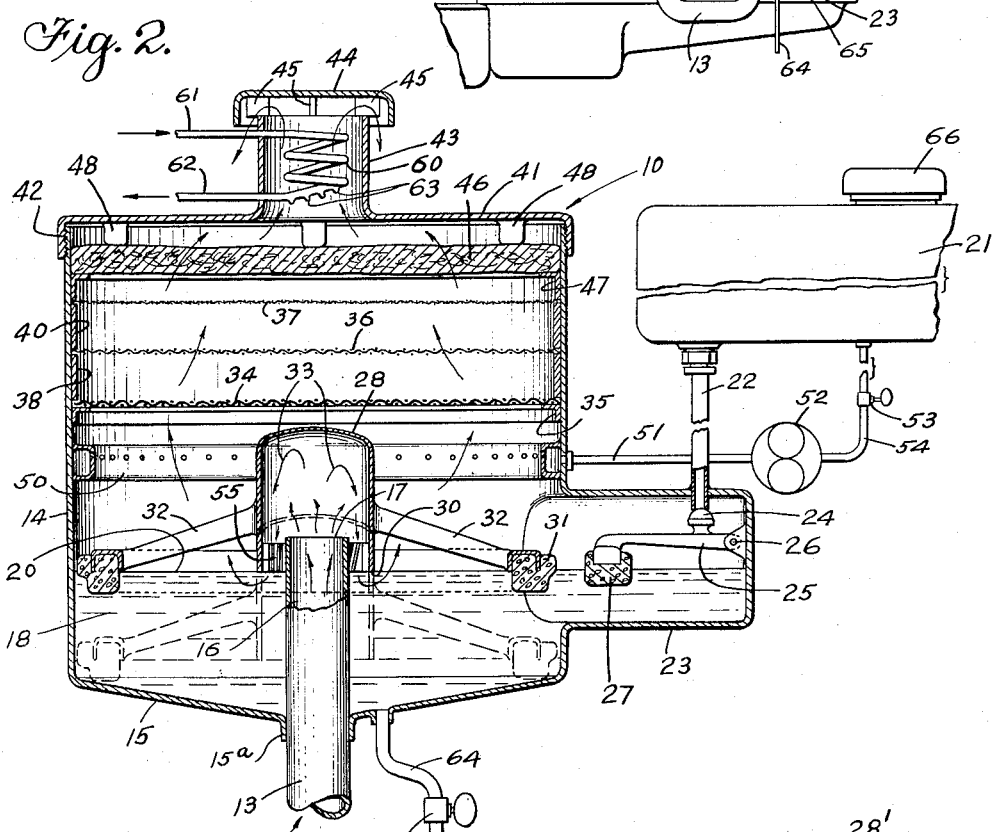
Fig. 2 is an enlarged sectional view showing the exhaust gas treating apparatus of the present invention.

As shown in Fig. 2, it may be desirable to place a filter as indicated at 46 intermediate the screens and the cover or cap portion 41. In this event, the filter 46 may be supported on an annular bracket 47 and maintained in its shaped configuration as by a plurality of bosses 48 which extend downwardly from the inner surface of the cover 41. The filter 46 may be of any of a variety of substances, however, it is contemplated that this filter may be in the form of loosely woven fiber glass or other like substances that will be unaffected by any corrosive action that may be inherent in the exhaust gases. Furthermore, it may be desirable to suitably ionize the material in the fibers of the filter 46 in order that electrically charged particles in the exhaust gases may be attracted thereto to insure removal therefrom from the exhaust gases. Ionized material of this type is well known and the means for creating such ionization forms no particular part of the present invention.

It may thus be seen that a filter means is established intermediate the liquid 18 and the discharge passage created by the exhaust stack 43 and that this filter means is in the form of a plurality of filters as created by the multiple screens 34, 36 and 37 and by the relatively coarse filter 46. Through use of these relatively open mesh filter devices, back pressure on the engine 11 is largely eliminated.

In some instances, it may be desirable to add additional liquid or liquid vapor to the exhaust gases leaving the quantity of liquid 18. In this event, a ring shaped spray nozzle 50 may be disposed inwardly from the inner surface of the housing 14 and positioned intermediate the lowermost screen 34 and the surface 20 of the liquid 18. Liquid is supplied to the ring nozzle 50 as by a conduit 51 by way of a pump 52. The intake of the pump 52 may be connected to any suitable source such as, for example, the tank 21 and a valve 53 may be disposed in a conduit 54 extending from the intake of the pump 52 to the tank 21. Accordingly, additional vapor or moisture may be introduced as may be desired.

In another instance, it may be desirable to add a slight swirl to the exhaust gases entering the liquid 18 in order to induce greater turbulence in the liquid and insure adequate scrubbing of the exhaust gases. In this event, a plurality of swirl vanes 55 may be positioned adjacent the open end 30 of the deflector 28 so that the exhaust gases must pass the deflector and the vanes 55 before entering the liquid 18. The presence of the vanes 55 in the exhaust end of the deflector 28 will cause slight rotary movement of the deflector 28 together with the float member 31 and arms 32, however, the resistance of the liquid 18 will insure a lower rotational speed of the deflector 28 than that which is induced to the exhaust gases prior to entry into the liquid 18.

Figure 3:
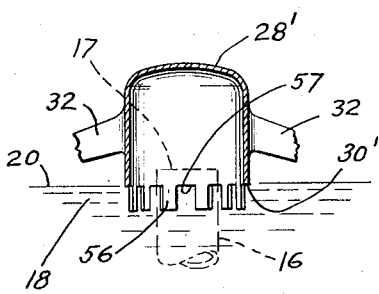
Fig. 3 is a fragmentary sectional view showing an alternative arrangement of an exhaust gas deflector.

As shown primarily in Fig. 3, other means may be utilized to insure turbulence of the exhaust gases upon entry into the liquid 18 such as, for example, the provision of a plurality of alternate fingers and openings 56 and 57 in the lower end 30' of a modified deflector 28'. As shown in Fig. 3, the exhaust gases entering the deflector 28' will pass partly outwardly through the openings 57 and partially downwardly past the fingers 56 and into the central area of the liquid 18.

In some instances, it has been further found that under certain operating conditions, it may be desirable to provide means for condensing moisture that would otherwise be carried out in the cleansed exhaust gases through the exhaust stack 43. As shown in Fig. 2, suitable coil 60 may be disposed in the exhaust stack 43 and may have entrance and exit conduits 61 and 62 that extend to a suitable means for refrigerating a coolant passing therethrough. The coils 60 may also be provided with a plurality of downwardly directed knobs 63 from which collected moisture may drain back into the housing 14. It may be seen that the temperature of the exhaust gases will effect heating and an amount of evaporation of the liquid 18 and that the vapor contained within the cleansed exhaust gases may be condensed from the gases and returned to the unit by reason of the condenser coils 60 and the passage of the gases thereover. Naturally, much of the entrained vapor will be collected upon the screens 34, 36 and 37 and on the filter 46 thereafter to be drained back into the lower portion of the housing 14. Excessive evaporation of the liquid 18 is thereby prevented thus enabling considerably longer periods between necessary service of the unit. In connection with the condenser coils 60, it is to be understood that these coils may be placed in any desirable location relative to the exhaust stack 43 and, in any event, in position to cause a reduction in temperature of the gases passing through the exhaust stack or therefrom.

It may be seen that, in view of the multiple filter arrangements, a considerable muffling effect is had upon the sound of the exhaust gases being emitted from the engine thereby eliminating the necessity for a conventionally muffler or the like.

At regular intervals, it is desirable that the liquid 18 together with the contaminants collected thereby be drained from the housing 14. For such a purpose, a conduit 64 may be fitted adjacent the lower end of the conical portion 15 with this conduit extending to any suitable location beneath the engine 11. A valve member 65 may be positioned in the conduit 64 in order manually to control the flow of the liquid 18 from the housing 14. In the event that liquid may still remain within the tank 21, this remaining liquid may be permitted to flow into the housing 14 thereby to flush the interior thereof. Upon closing the valve 65, the tank 21 may thereafter be again filled as through a suitable cap or filler member 66 so as to enable continual operation of the device.

It may thus be seen that the present invention provides means for cleansing engine exhaust gases and removing therefrom at least a portion of the air pollutants contained in such exhaust gases. By so doing, the amount of such pollutants reaching the atmosphere will be substantially reduced. Even though the device of the present invention requires occasional service, such service is not only feasible but necessary in much the same manner as the beforementioned rubbish may periodically be collected and removed from living quarters. Action of this type should not be too much to expect from the operators of motor vehicles in order that the motoring public and individuals residing in heavily inhabited areas enjoy the health and other benefits of unpolluted atmosphere.

Having thus described the invention and the present embodiments thereof, it is desired to emphasize the fact that many modifications may be resorted to in a manner limited only by a just interpretation of the following claim.

I claim:

An engine exhaust gas treating apparatus comprising, in combination: a housing; a water supply; a quantity of water disposed in a lower portion of said housing; means associated with said supply for maintaining said water at a substantially constant level in said housing; means to drain said water from said housing; an exhaust gas conducting conduit extending upwardly through said water and having a free end portion disposed above the surface of said water; an inverted cup-shaped deflector disposed over said free end of said conduit, said deflector having an open lower end; a plurality of swirl vanes carried by said deflector adjacent said lower end; a float connected with said deflector and floatable on said water for maintaining said lower end of said reflector in contact with the surface of said water; passage means for conducting said gases from said housing; a plurality of filters intermediate said passage means and the surface of said water, at least a portion of said filters being ionized to enable collection of particles having a particular electrical charge; and a condenser disposed downstream from said filters for removing entrained moisture in said exhaust gases leaving said filters.

References Cited in the file of this patent

UNITED STATES PATENTS

| | | |
|---|---|---|
| 1,142,073 | Wolff | June 8, 1915 |
| 1,170,827 | Kroyer | Feb. 8, 1916 |
| 1,411,950 | Wyatt | Apr. 4, 1922 |
| 1,466,500 | Ford | Aug. 28, 1923 |
| 1,586,405 | Burge | May. 25, 1926 |
| 1,606,032 | Kolstrand | Nov. 9, 1926 |
| 1,836,868 | Page | Dec. 15, 1931 |
| 2,071,116 | French | Feb. 16, 1937 |
| 2,171,893 | Robinson | Sept. 5, 1939 |
| 2,216,653 | Sauer | Oct. 1, 1940 |
| 2,405,494 | Dupuy | Aug. 6, 1946 |
| 2,538,450 | Gardner | Jan. 16, 1951 |
| 2,709,335 | Van Vactor | May 31, 1955 |

FOREIGN PATENTS

| | | |
|---|---|---|
| 7,292 | Great Britain | Apr. 10, 1893 |
| 28,048 | Great Britain | Dec. 2, 1910 |
| 466,321 | Great Britain | May 26, 1937 |
| 425,059 | France | Mar. 28, 1911 |
| 834,510 | France | Aug. 22, 1938 |